United States Patent Office 2,837,508
Patented June 3, 1958

2,837,508

MONOAZO DYESTUFFS

Franz Frisch, Arlesheim, Switzerland, assignor, by mesne assignments, to Saul & Co., Newark, N. J., as nominee of Fidelity Union Trust Company, executive trustee under Sandoz Trust No Drawing. Application November 15, 1954
Serial No. 469,038

Claims priority, application Switzerland
November 19, 1953

6 Claims. (Cl. 260—196)

The present invention relates to acid, metallisable monoazo dyestuffs and represents a further development of the invention described in U. S. Patent No. 2,776,960 (patent application Ser. No. 328,511).

The new acid, metallisable monoazo dyestuffs correspond to the general formula

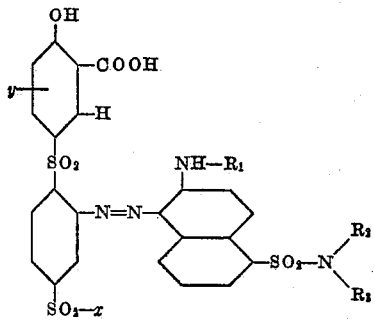

(I)

wherein $x$ stands for lower alkyl, aralkyl, a radical of the benzene series or the radical

R' being hydrogen or lower alkyl, and R" being lower alkyl, cycloalkyl, aralkyl or mononuclear aryl, R' and R" having together at most 14 carbon atoms
$y$ stands for hydrogen or methyl
$R_1$ stands for hydrogen, methyl or ethyl
$R_2$ stands for hydrogen or lower alkyl, and
$R_3$ stands for lower alkyl, cycloalkyl, aralkyl or a radical of the benzene series The dyestuffs dissolve in water with orange, red or blue-red colorations, and dye wool from a neutral or weakly acid bath in brilliant yellowish-red to blue-red shades, which are only slightly altered by after-chroming. They are also suitable for dyeing by means of the single bath chroming process. The dyeings obtained are very fast to light, to milling, and to carbonisation.

The new acid, metallisable monoazo dyestuffs are obtained by coupling one mol of the diazo compound from an amine corresponding to the formula

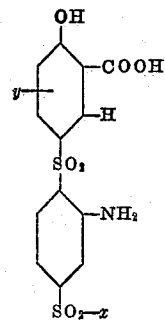

(II)

wherein $x$ and $y$ have the previously defined significances, with one mol of an aminonaphthalene compound corresponding to the formula

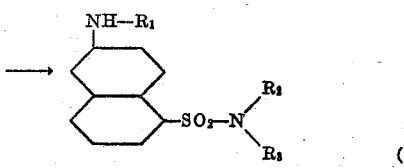

(III)

wherein $R_1$, $R_2$ and $R_3$ have the previously defined significances.

In the amine of the composition (II), $x$ denotes not only alkyl, aralkyl, or a mononuclear aryl, but also, for example, —NH-alkyl, —NH-cycoalkyl, —NH-aralkyl, —NH-aryl,

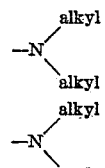

or

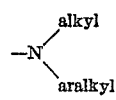

A large number of amines are therefore suitable to serve in the form of their diazo compounds, for the synthesis of the new metallisable monoazo dyestuffs. As the most important members, mention may be made, for example, of: 2-amino-4-methylsulfonyl-4'-hydroxy - 1.1'-diphenyl-sulfone-3'-carboxylic acid; 2-amino - 4 - benzylsulfonyl-4'-hydroxy - 1.1' - diphenylsulfone-3'-carboxylic acid, 2-amino-4-phenylsulfonyl-4'-hydroxy-1.1' - diphenylsulfone-3'-carboxylic acid; 2-amino - 3'-carboxy-4'-hydroxy-1.1'-diphenylsulfone-4-sulfonic acid-methylamide; 2-amino-3'-carboxy-4'-hydroxy-1.1' - diphenylsulfone - 4 - sulfonic acid-cyclohexylamide; 2-amino - 3' - carboxy-4'-hydroxy-1.1' - diphenylsulfone - 4 - sulfonic acid-phenylamide; 2-amino-3'-carboxy - 4' - hydroxy - 1.1'-diphenylsulfone-4-sulfonic acid-dimethylamide; 2 - amino - 3' - carboxy-4'-hydroxy-1.1'-diphenylsulfone-4-sulfonic acid-(N-ethyl)-phenylamide, and 2-amino-3'-carboxy-4'-hydroxy-1.1'-diphenylsulfone-4-sulfonic acid-(N-methyl)-benzylamide.

As aminonaphthalene compounds of the composition (III), there come into consideration, for instance, 2-aminonaphthalene-5-sulfonic acid-methylamide, 2-aminonaphthalene-5-sulfonic acid-phenylamide, 2-methylaminonaphthalene-5-sulfonic acid-methylamide, 2-methylaminonaphthalene-5-sulfonic acid-ethylamide, 2-methylaminonaphthalene-5-sulfonic acid-cyclohexylamide, 2-methylaminonaphthalene-5-sulfonic acid-dimethylamide and 2-methylaminonaphthalene-5-sulfonic acid-(N-ethyl)-phenylamide.

For carrying out the process, the diazo compound derived from the amine (II) is coupled with the aminonaphthalene compound (III) in a weak mineral acid or organic acid medium, if desired with the addition of an organic solvent. After coupling is completed, the monoazo dyestuff which is formed is filtered off, if necessary after previously evaporating off the organic solvent, and converted into the ammonium or lithium or sodium or potassium salts by dissolving in dilute aqueous ammonia, or in lithium, sodium, or potassium carbonate solution respectively. The salts thereby formed are salted out, filtered off, and dried.

The following examples illustrate the invention without limiting it. The parts given therein denote parts by weight, the percentages denote percentages by weight, and the temperatures are in degrees centigrade.

*Example 1*

37.1 parts of 2-amino-4-methylsulfonyl-4'-hydroxy-1.1'-diphenylsulfone-3'-carboxylic acid are dissolved in 500 parts of water, to form a neutral solution by addition of sodium hydroxide. The solution is treated with 36 parts of a 20% solution of sodium nitrite, and is then run at a temperature not exceeding 10° within half an hour, into a mixture of 40 parts of concentrated hydrochloric acid, and 200 parts of water. The yellowish diazo compound which is formed soon separates out almost completely. When the diazotisation is completed, the excess of nitrous acid is decomposed by the addition of urea to the diazo suspension. To the diazo suspension, which is acid to Congo, there is added dropwise at 10–15° a solution of 23 parts of 2-aminonaphthalene-5-sulfonic acid-methylamide in 500 parts of water and 15 parts of concentrated hydrochloric acid. The orange colored monoazo dyestuff which is formed separates out, and after coupling is finished, it is filtered off. By re-dissolving it in hot sodium carbonate solution, salting out, filtering off, and drying, it is obtained as an orange colored powder, which dissolves in hot water with a reddish-orange coloration. It corresponds to the formula

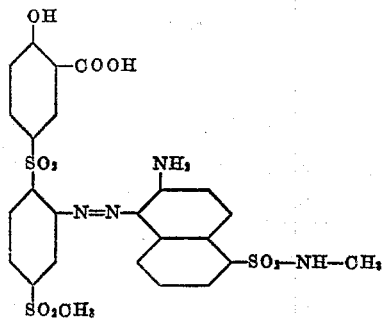

and dyes wool by the single bath chroming process in brilliant red-orange shades of excellent fastness to light, very good fastness to carbonisation, and very good fastness to milling.

*Example 2*

45 parts of 2-amino-4-benzylsulfonyl-4'-hydroxy-1.1'-diphenylsulfone-3'-carboxylic acid are diazotized according to the data given in Example 1. When the nitrous acid has disappeared from the yellow diazo suspension which is formed, a solution of 23 parts of 2-aminonaphthalene-5-sulfonic acid-methylamide in 500 parts of water and 15 parts of concentrated hydrochloric acid, is added to the diazo suspension at 10–15°. The orange-colored monoazo dyestuff which is formed, separates out, and after coupling is finished, it is filtered off. By re-dissolving it in hot sodium carbonate solution, salting out, filtering off, and drying, it is obtained as an orange-colored powder which dissolves in hot water with an orange color. It corresponds to the formula

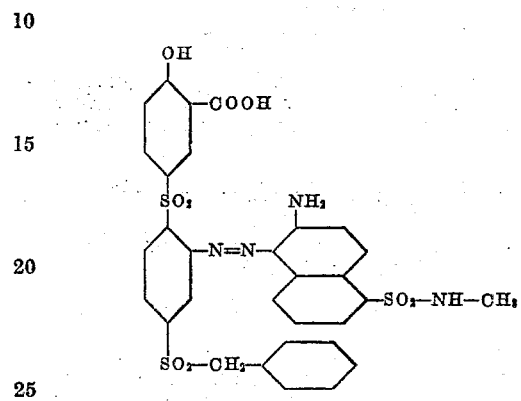

and dyes wool by the single bath chroming process in bright reddish-orange shades of excellent fastness to light, very good fastness to carbonisation, and very good fastness to milling.

*Example 3*

39 parts of 2-amino-3'-carboxy-4'-hydroxy-1.1'-diphenylsulfone-4-sulfonic acid-methylamide are diazotized according to the data given in Example 1. The excess of nitrous acid is decomposed by means of aminosulfonic acid; when this excess has disappeared, the yellow diazo compound which has separated out is filtered off, and added with stirring at 10–15° into a solution of 29.8 parts of 2-aminonaphthalene-5-sulfonic acid-phenylamide and 15 parts of crystallized sodium acetate in 300 parts of methyl alcohol. The orange-colored monoazo dyestuff which is formed separates in crystalline form, and is filtered off when coupling is completed. By redissolving in a dilute hot sodium carbonate solution, salting out, filtering off and drying, it is obtained as an orange-colored powder, which dissolves easily in hot water with an orange color. It corresponds to the formula

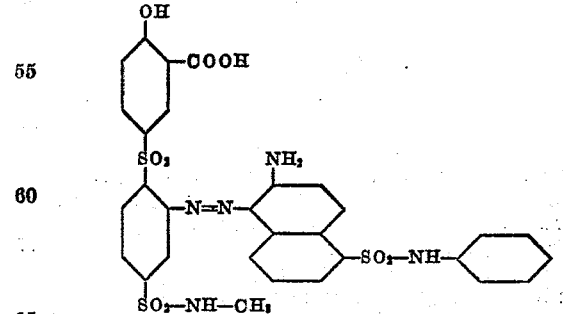

and dyes wool according to the single bath chroming process in bright orange shades, of excellent fastness to light, very good fastness to carbonisation, and very good fastness to milling.

The table shows other metallisable acid monoazo dyestuffs, which can be prepared in the manner described in the foregoing examples. In the table, the diazo components are shown in column (A), the coupling components in column (B), and the shade of the dyeings of the chromed dyestuffs on wool in column (C):

| Ex. No. | (A) | (B) | (C) |
|---|---|---|---|
| 4 | 2-amino-4'-methylsulfonyl-4'-hydroxy-1.1'-diphenylsulfone-3'-carboxylic acid. | 2-methylaminonaphthalene-5-sulfonic acid-methylamide. | Bluish red. |
| 5 | 2-amino-3'-carboxy-4'-hydroxy-1.1'-diphenyl-sulfone-4-sulfonic acid-cyclohexylamide. | 2-aminonaphthalene-5-sulfonic acid-methylamide. | Orange. |
| 6 | 2-amino-3'-carboxy-4'-hydroxy-1.1'-diphenyl-sulfone-4-sulfonic acid-methylamide. | 2-aminonaphthalene-5-sulfonic acid-(N-methyl)-phenylamide. | Do. |
| 7 | 2-amino-3'-carboxy-4'-hydroxy-1.1'-diphenyl-sulfone-4-sulfonic acid-(N-ethyl)-phenylamide. | 2-methylaminonaphthalene-5-sulfonic acid-methylamide. | Scarlet. |
| 8 | 2-amino-4-methylsulfonyl-4'-hydroxy-1.1'-diphenylsulfone-3'-carboxylic acid. | 2-aminonaphthalene-5-sulfonic acid-cyclohexylamide. | Red-orange. |
| 9 | 2-amino-4-ethylsulfonyl-4'-hydroxy-1.1'-diphenylsulfone-3'-carboxylic acid. | 2-ethylaminonaphthalene-5-sulfonic acid-methylamide. | Bluish red. |
| 10 | 2-amino-4-phenylsulfonyl-4'-hydroxy-1.1'-diphenylsulfone-3'-carboxylic acid. | 2-aminonaphthalene-5-sulfonic acid-(N-ethyl)-phenylamide. | Red. |
| 11 | 2-amino-4-(4''-methyl)-phenylsulfonyl-4'-hydroxy-1.1'-diphenyl-sulfone-3'-carboxylic acid. | 2-aminonaphthalene-5-sulfonic acid-benzylamide. | Do. |
| 12 | 2-amino-3'-carboxy-4'-hydroxy-1.1'-diphenyl-sulfone-4-sulfonic acid-(N-methyl)-benzylamide. | 2-aminonaphthalene-5-sulfonic acid-(N-methyl)-benzylamide. | Orange-red. |
| 13 | 2-amino-3'-carboxy-4'-hydroxy-1.1'-diphenyl-sulfone-4-sulfonic acid-ethylamide. | 2-methylaminonaphthalene-5-sulfonic acid-ethylamide. | Bluish red. |
| 14 | 2-amino-3'-carboxy-4'-hydroxy-1.1'-diphenyl-sulfone-4-sulfonic acid-phenylamide. | 2-methylaminonaphthalene-5-sulfonic acid-dimethylamide. | Do. |
| 15 | 2-amino-3'-carboxy-4'-hydroxy-1.1'-diphenyl-sulfone-4-sulfonic acid-benzylamide. | 2-methylaminonaphthalene-5-sulfonic acid-dimethylamide. | Do. |
| 16 | 2-amino-3'-carboxy-4'-hydroxy-1.1'-diphenyl-sulfone-4-sulphonic acid-(N-methyl)-benzylamide. | 2-methylaminonaphthalene-5-sulfonic acid-diethylamide. | Do. |
| 17 | 2-amino-3'-carboxy-4'-hydroxy-1.1'-diphenyl-sulfone-4-sulfonic acid-(4''-methyl)-phenylamide. | 2-aminonaphthalene-5-sulfonic acid-methylamide. | Orange. |
| 18 | 2-amino-3'-carboxy-4'-hydroxy-1.1'-diphenyl-sulfone-4-sulfonic acid-dimethylamide. | 2-aminonaphthalene-5-sulfonic acid-(4'-methyl)-phenylamide. | Do. |
| 19 | 2-amino-3'-carboxy-4'-hydroxy-1.1'-diphenyl-sulfone-4-sulfonic acid-diethylamide. | 2-methylaminonaphthalene-5-sulfonic acid-butylamide. | Bluish red. |
| 20 | 2-amino-3'-carboxy-4'-hydroxy-1.1'-diphenyl-sulfone-4-sulfonic acid-propylamide. | 2-aminonaphthalene-5-sulfonic acid-hexylamide. | Orange. |
| 21 | 2-amino-3'-carboxy-4'-hydroxy-6'-methyl-1.1'-diphenylsulfone-4-sulfonic acid-methylamide. | 2-aminonaphthalene-5-sulfonic acid-methylamide. | Do. |
| 22 | 2-amino-4-benzylsulfonyl-4'-hydroxy-5'-methyl-1.1'-diphenylsulfone-3'-carboxylic acid. | 2-methylaminonaphthalene-5-sulfonic acid-methylamide. | Bluish red. |

The following are formulae of representative products of the foregoing examples.

*Example 4*

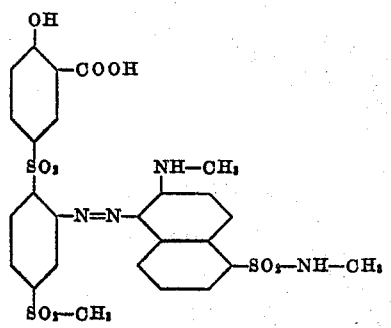

*Example 8*

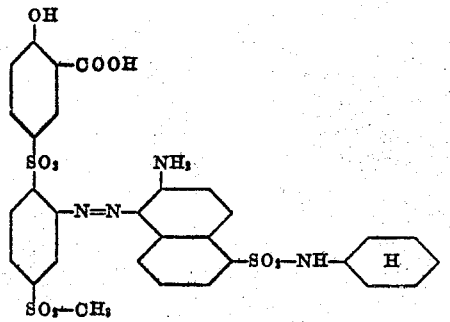

*Example 23*

Dyebaths were made up from 2 parts of each of the dyestuffs described in Examples 1–22 and a mixture of the following ingredients was used in making up each dyebath: 1 part of potassium chromate, 5 parts of ammonium sulfate, 10 parts of sodium sulfate and 5000 parts of water. Dyeings were made from each dyebath as follows: 100 parts of pre-wetted wool were placed into the dyebath at 30–40°. The temperature of the dyebath was brought to 100° and the bath kept near the boiling temperature for 1½ hours, while keeping the wool on the move. After this time the dyestuff had been completely taken up by the wool; the dyed goods were then thoroughly rinsed with cold water and dried.

*Example 24*

Dyebaths were made up from 2 parts of each of the dyestuffs described in Examples 1 to 22 and a mixture of the following ingredients was used in making up each dyebath: 2 parts of concentrated acetic acid, 10 parts of sodium sulfate and 5000 parts of water. Dyeings were made from each dyebath as follows: 100 parts of pre-wetted wool were placed into the dyebath which was brought to the boil within half an hour and kept near the boiling temperature for 1 hour. During this time 2 parts of concentrated formic acid were added to the bath. After the dyeing process was complete the bath was cooled down to 70° by the addition of cold water and 1 part of potassium bichromate was added to the bath which was then brought to the boil for half an hour. After this chroming operation the dyeing was rinsed and dried.

Having thus disclosed the invention what is claimed is:

1. A monoazo dyestuff corresponding to the formula

wherein $x$ stands for a member selected from the group consisting of lower alkyl, benzyl, phenyl, lower alkylamino, cycloalkylamino, benzylamino, phenylamino, methylphenylamino, N,N-lower dialkylamino, N-lower alkyl-N-benzylamino and N-lower alkyl-N-phenylamino, the substituted amino groups containing a total of not more than 14 carbon atoms, $y$ stands for a member selected from the group consisting of hydrogen and methyl, $R_1$ stands for a member selected from the group consisting of hydrogen, methyl and ethyl, $R_2$ stands for a member selected from the group consisting of hydrogen and lower alkyl, and $R_3$ stands for a member selected from the group consisting of lower alkyl, cycloalkyl, aralkyl and phenyl.

2. The monoazo dyestuff corresponding to the formula

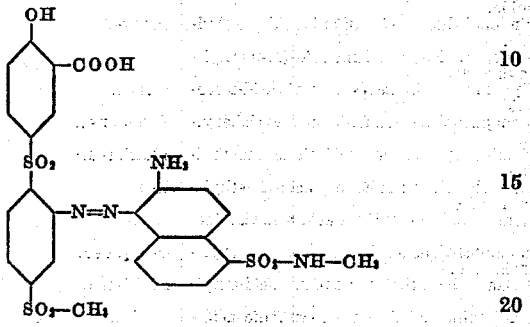

3. The monoazo dyestuff corresponding to the formula

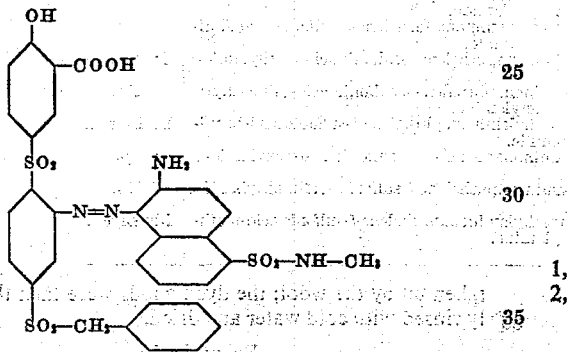

4. The monoazo dyestuff corresponding to the formula

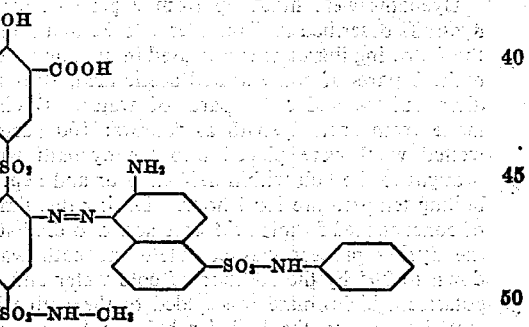

5. The monoazo dyestuff corresponding to the formula

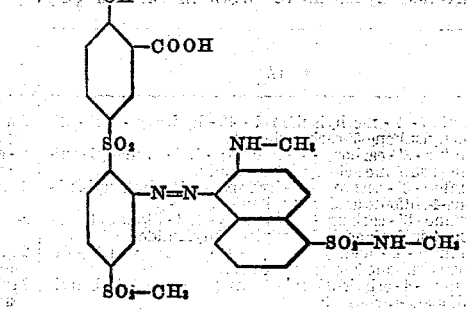

6. The monoazo dyestuff corresponding to the formula

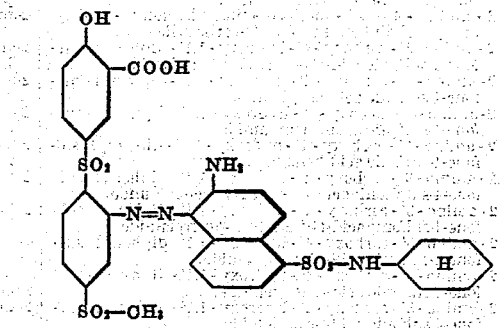

References Cited in the file of this patent
UNITED STATES PATENTS

| | | |
|---|---|---|
| 1,901,515 | Hentrich et al. | Mar. 14, 1933 |
| 2,476,259 | Mayer et al. | July 12, 1949 |